July 4, 1961

D. L. BARNEY 2,991,378

COMPOSITE MAGNETIC CORE STRUCTURE
AND METHOD OF MAKING SAME

Filed Jan. 2, 1958

Inventor:
Duane L. Barney,
by James R. Campbell
His Attorney.

United States Patent Office 2,991,378
Patented July 4, 1961

2,991,378
COMPOSITE MAGNETIC CORE STRUCTURE
AND METHOD OF MAKING SAME
Duane L. Barney, Schenectady, N.Y., assignor to General
Electric Company, a corporation of New York
Filed Jan. 2, 1958, Ser. No. 706,756
11 Claims. (Cl. 310—211)

The invention described herein relates to electrical equipment and more particularly to improved composite bodies and to the method of obtaining a firm connection between metallic parts through the instrumentality of a bonding and insulating agent.

In the manufacture of electrical equipment, difficulty has been experienced in establishing and maintaining a completely acceptable bonding and/or insulating effect between metallic components, such as the conductors and slot walls in a rotor of a squirrel cage induction motor, between laminations comprising the various types of rotors used in dynamoelectric machines, between laminations in transformers, and the like.

Considering the need for a bonding and insulating medium between conductors and slot walls in a squirrel cage rotor, it is known that skewing of the rotor bars will increase machine performance but insulation must be provided between the bars and slot walls to minimize other detrimental effects resulting from skewing. Various processes have been employed for providing such insulation, a common one being that of insulating the slots with a phosphate prior to casting the conductors. Some degree of protection is achieved by this process, but since oxide coatings on the steel slot walls must be removed prior to application of the phosphate, complete insulation of the rotor slots does not always result. Likewise, a bonding action is not obtainable between the conductors and slot walls. The oxide removal or pickling step which is carried out prior to annealing the rotor is a hazardous one, since strong toxic and corrosive sulphuric and hydrofluoric acids are utilized in the operation. Frequent tests must be made during the insulating process to assure uniformity of solution, and when it falls to a predetermined low value, rejuvenation of the solution must be carried out to restore the chemical constituents to the desired level in the bath. Other known methods capable of providing a layer of insulation in the rotor slots having characteristics similar to that described above consists in austalizing or applying electrophoretic coatings, and the like, to the slots, but these also are subject to the disadvantages of being unwieldy in application and not capable of providing a uniform layer of insulation in the skewed slots of squirrel cage rotors.

The processes described above also require a considerable amount of factory equipment which consumes valuable floor space, requires maintenance and, because of the large number of steps involved in the process of coating a layer of insulation on the rotor slots, labor costs approach values deemed prohibitive in most cases.

In transformer and rotor constructions, the laminations usually are provided with an oxide or enamel coating for decreasing the likelihood of magnetic short circuits, but the oxide is not considered to be completely effective as an insulator. Also, since the laminated cores must be secured together by welds extending axially of the core, or by other members of metallic composition, full utilization of the magnetic circuit cannot be realized and core losses therefore are greater than otherwise would appear in a structure where the laminations are firmly bonded together solely by a non-conducting medium.

It therefore is an object of my invention to provide a process for bonding metallic components together by reacting oxides deposited on the metallic components with a glass-forming material in the presence of heat to produce a reaction product displaying electrical insulating characteristics.

Another object of the invention is to provide a composite body formed by practicing the above-mentioned process wherein the metallic components are held together by a bonding and insulating substance.

In accordance with one aspect of my invention, I assemble a plurality of laminations or punchings in a stack of the desired size to form a rotor and then submerge the stacked punchings in a degreasing bath for removing grease or other impurities thereon prior to annealing the rotor in a furnace. After annealing, borax material is applied to the clean oxide-coated rotor slots to provide a uniform coating thereon which is utilized in ultimately forming the bonding and insulating layer of insulation. The coated rotor is then preheated for removing any moisture and for bringing it up to a temperature to permit pouring molten aluminum (950° C.) therein. During casting, heat from the molten aluminum initiates a chemical reaction between the iron oxides formed on the slot walls and the borax material previously applied thereto to form a reaction product having glass-like characteristics. Reaction also is believed to take place between the aluminum and the borax to form other boron compounds. The product formed thus rigidly bonds the conductors and slot walls together while simultaneously serving an insulating function.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

Figure 1:
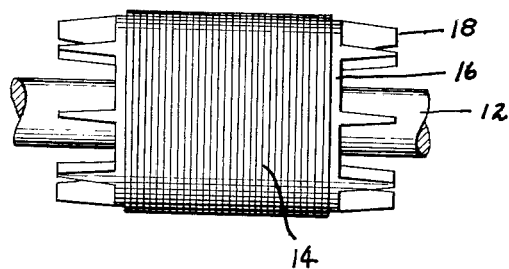
FIGURE 1 is a view in elevation of a conventional squirrel cage rotor.
Figure 2:
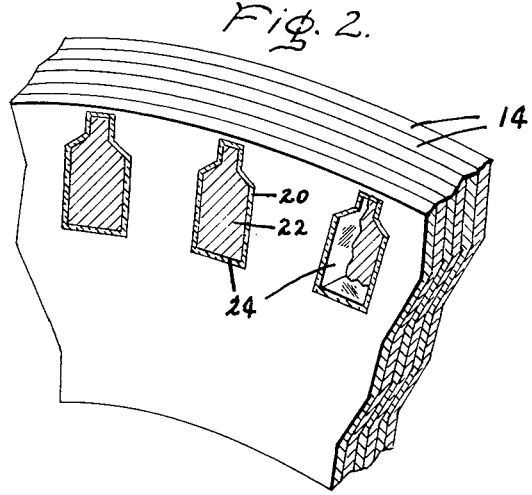
FIGURE 2 is a perspective view of a plurality of laminations taken on a line substantially through the center of FIGURE 1 of the rotor.

Referring now to the drawing wherein like reference characters designate like or corresponding parts throughout the several views, there is shown a shaft 12 supporting a plurality of laminations or punchings 14 having end rings 16 and fan blades 18 attached to opposite ends thereof. The rotor shown is of a conventional type having skewed conductor slots therein, although this figure does not show the arrangement of such conductors in the rotor. As illustrated in FIGURE 2, each of the conductor slots 20 is provided with aluminum conductors 22 which are electrically insulated from, but bonded to, the slot walls by a glass-like substance or layer 24, which is shown as being exaggerated in thickness for purposes of illustration.

The process employed for obtaining the electrical insulating and bonding layer 24 is based on the fact that such a layer can be produced on metal by reacting borax with iron and with aluminum or aluminum oxides associated with the metals being joined. The oxides are formed on the iron when subjected to air and this layer of oxides is made heavier during the annealing of the rotor for facilitating the chemical action with borax. The metallic aluminum forming conductors 22, however, is believed to react directly with the borax when the former is in a molten state and thereby produces a boride serving to bond the aluminum to the insulating material.

It is well known that molten borax reacts with iron oxides to produce a glass when subjected to temperatures in the 800° C. range. In order to obtain a coating of borax on the iron slots, the process followed is that of assembling a plurality of laminations or punchings of the desired size for forming the rotor body. Those portions of the punchings defining the rotor slots are provided with a slight oxide coating as a result of oxidation resulting from mere exposure to air. The slot surfaces also contain deposits of impurities, such as dirt, oils, grease, and the like, and these are conveniently removed by submerging the assembled rotor (punchings only) in a degreasing bath of a strong alkaline soap solution or carbon tetrachloride, or other solution capable of removing the foreign deposits. The clean but oxide coated rotor is then annealed according to standard practices to form an oxide layer of even greater thickness on the slot walls. In view of the above, it is evident that oxide coating normally appearing on the steel punchings is not removed at any time and this coating is augmented during the annealing operation to provide a gray-colored oxide layer so thick that it can be peeled from the slot surfaces. Also, in lieu of dipping the rotor in a degreasing solution, the impurities can be burned off the rotor during the annealing step, since it is subjected to the annealing heat for approximately 10–12 hours. Upon being removed from the annealing oven and cooled, the rotor is then dipped in a bath of a saturated solution of borax for approximately thirty seconds.

The use of borax for providing a deposit on the rotor slots is particularly attractive for factory operations because of the simplicity of operation and ease of control over the solution. The saturated solution of borax consists of approximately 5.5 pounds of borax per gallon of water at 80° C. The solubility of borax in water greatly increases with increasing temperatures, thereby permitting the application of varying amounts of borax to different rotors merely by changing the temperature of the bath. Further, the bath can be monitored by merely measuring the specific gravity of the solution. Thus, only one chemical is used which can be readily and simply controlled by commercially available control equipment. A particular advantage also is that the borax is non-toxic and non-corrosive, thus eliminating the hazardous aspects encountered in the prior art processes. Furthermore, a single step involving a single container now performs the function of as many as four steps and containers which required pickling times of at least thirty minutes for each rotor insulated by the prior art processes.

Upon removal from the borax bath and subsequent drying, the rotor is completely covered with a white crystalline substance consisting essentially of borax placed in intimate contact with the thick oxide coated surfaces of the slots. An alternative method of applying the borax consists in dusting or spraying it in slots previously wetted by water or other liquid substance.

Prior to casting of the aluminum bars, the rotor must be preheated to drive off moisture and to bring it closer to a temperature compatible with molten aluminum. Centrifugally cast rotors are usually preheated to 525° C. but this temperature is not sufficient to cause melting of the borax coating since its melting point is approximately 800° C.

When the preheating process is complete and prior to casting, the rotor is subjected to a pressure of approximately 20 tons for assuring an abutting relationship of the laminations and thereby confining the molten material to the slots and end rings. The application of such a pressure has revealed no significant flaking of the borax coating and no noticeable amount of material was squeezed from the slots.

The preheated and coated rotor is then placed in a centrifugal mold and molten aluminum, or other conductor bar material having a temperature in the neighborhood of 950° C., is poured in the slots for forming the casting for the rotor. When the molten mass strikes the borax coated slots, heat is immediately transferred to the lower temperature slot walls and the borax, thus causing a melting thereof and consequent initiation of a chemical reaction between the borax and oxide coated on the walls of the slots. Since the oxide layer is relatively thick and the temperature is sustained temporarily at a point above the melting temperature of the borax, a thorough reaction takes place which converts all of the borax into a molten glass mass completely encompassing the cast conductors. Simultaneously, the molten conductor bars, now shaped to the configuration of the slots, reacts with the borax also, with the result that both the slot walls and the conductors are bonded together through the instrumentality of the glass. During the reaction, the reaction product has a particular affinity for the iron in the slots and the aluminum, and consequently firmly adheres thereto while also serving to space them from each other. Upon cooling, the product displays excellent electrical insulating properties, which is advantageously employed during operation of the rotor in a machine. Rotation of the mold and rotor is continued until the aluminum freezes in the slots, whereupon removal of the mold apparatus can be accomplished. The teachings of the invention are equally applicable to other forms of casting, as static casting for example.

Another desirable function served by the reaction product is that, upon melting, it thoroughly wets the exposed slot surfaces and is particularly effective in wetting those portions of a slot having a configuration presenting a very small surface area. The wetting therefore not only facilitates flow of molten aluminum in the slots but also makes accessible those small and remote slot areas not normally approachable by the molten material.

In some cases, it may be preferable to have the borax melt at a lower temperature, and this can be accomplished by merely mixing well-known additives with the borax solution used in providing a deposit on the oxide coated surfaces.

In order to determine the effectiveness of the insulation and bonding process described above, rotors treated with the prior art insulating processes were compared with those treated by this new process by operating each rotor in the same stator frame. Five different sizes of rotors were used, including one each of two pole, four pole, eight pole and two six-pole rotors. Some of the tests included starting and full-load torque tests for single and three phase motors, pull-up torque tests, heat runs for determining maximum temperature rise, and the like. In every size tested, the rotors treated in accordance with this invention compared favorably or excelled in performance over those insulation systems incorporated in prior art machines. Moreover, all similar rotors made by the process of my invention were uniform and compared favorably with the best individual rotors made by other processes.

Figure 3:
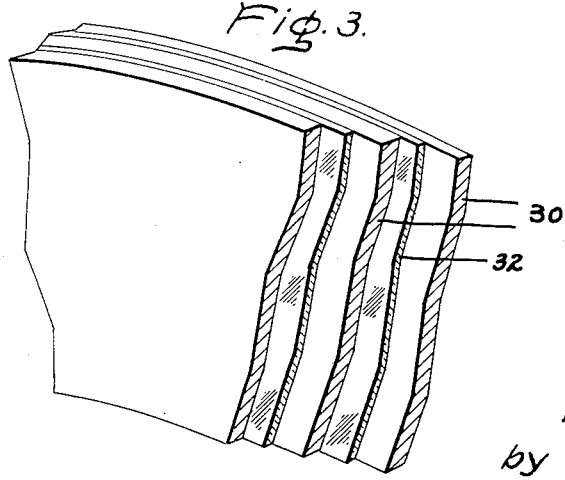
FIGURE 3 is a modification illustrating the application of an insulating and bonding layer of borax between adjacent laminations.

The concepts of this invention are equally applicable to other constructions. Referring to FIGURE 3, a plurality of steel laminations 30 of the type used in cores for transformers, dynamoelectric machines, and the like, are provided on either one or both sides with heavy oxide coating and a borax coating 32 of suitable thickness, shown as exaggerated for illustrative purposes. After application of the borax, the laminations are assembled to form the core and then pressed together by means of a hydraulic jack or other suitable pressure applying device. The core is subjected to heat in an oven having a temperature of approximately 800° C., which is sufficient to assure carrying out the chemical reaction between the oxides on the lamination surfaces and the borax, in the manner described above. Although the substance between the laminations assumes a liquid or semi-liquid state, it is not forced outwardly from between the laminations because of the affinity of the borax for the oxides.

Upon cooling and removal of pressure, a unitary laminated core structure results in which the laminations are separated from each other by an insulator which also serves to rigidly bond them together. Construction of cores in this manner removes the necessity of providing metallic elements or holding the laminations together and while also making available all of the metal for use in the magnetic circuit.

By carrying out this same process for coating the surfaces of laminations, the final heating step of 800° C. can be eliminiated and the lamination dipped in molten aluminum. The heat of the molten mass causes the reaction of oxide and borax to take place and when the lamination is moved about in the molten aluminum, a thin layer of aluminum is found to adhere tightly to one surface of the glass, while the other surface is tightly bonded to the steel lamination.

Although specific disclosures have been made with respect to the use of borax to produce a bonding and insulating layer between cast aluminum and annealed steel surfaces, it will be evident that other materials and constructions can be used which are capable of reacting with the iron oxides and molten metal when subjected to the heat of the molten medium. Such other materials comprise, for example, sodium ammonium phosphate and boric acid, although the results achieved from the use of these materials were not as beneficial as the borax.

In view of the above, it is evident that many modifications and variations are possible in light of the above teachings. It therefore is to be understood that within the scope of the appended claims, the invention may be practiced otherwise than as specifically described.

What I claim as new and desire to cover by Letters Patent of the United States is:

1. A method for providing a bonding and insulating layer of material between metals comprising the steps of forming an oxide coating on surfaces of said metals, applying a material over the oxide coated surfaces of a type capable of chemically reacting with the oxide in the presence of heat to provide a reaction product displaying bonding and insulating characteristics, and subjecting said metals with their coated surfaces to heat of a temperature sufficient to effect such chemical action between said material and the oxide, and thereby form a product upon cooling which bonds said metals together while also insulating them from each other.

2. A method for bonding metals to each other through the agency of an insulating material comprising the steps of forming an oxide coating on a surface of a first of said metals, applying a material over the oxide coated surface of said first metal, said material being of a type capable of chemically reacting with the oxide coating in the presence of heat to provide a reaction product displaying bonding and insulating characteristics, moving a molten mass of a second metal in contact with said first metal, and utilizing the heat of the molten metal to cause a chemical reaction between said material and oxide on the first metal for providing a layer between said metals comprising a reaction product displaying electrical insulating characteristics and capable of bonding said metals into a unitary structure.

3. A method for providing a bonding and insulating layer of material between metals comprising the steps of forming an oxide coated surface on one of said metals, applying a material over the oxide coated surface capable of chemically reacting with the oxide in the presence of heat to provide a reaction product displaying bonding and insulating characteristics, engaging said metal with its coated surface with a molten metal wherein the heat thereof effects the chemical reaction between said material and the oxide, and between the molten metal and material, to form a layer between the coated metal and the molten metal so that, upon cooling, the material serves to insulate the metals from each other while simultaneously serving as a bond therebetween.

4. A method for insulating conductors from the slots of a squirrel cage rotor comprising the steps of removing foreign elements deposited on walls of said slots while simultaneously augmenting the oxide coating thereon, applying a layer of material on said slot walls capable of reacting with the oxide to form a bonding and insulating substance, casting a molten metal in the slots for forming the winding of the rotor, and utilizing the heat from said molten metal to initiate and complete a chemical reaction between the oxide and material to form said substance effective in insulating the slot walls from the conductors in the slots while simultaneously forming a bonding medium therebetween.

5. A magnetic core member for use in electrical apparatus comprising a plurality of laminations stacked together to form said core, an insulating and bonding material between said laminations comprising a product formed in the presence of heat by reacting borax, and an oxide coated on said laminations.

6. A magnetic core member for use in electrical apparatus comprising a plurality of laminations stacked together to form said core and having conductor slots extending longitudinally of the core, a conductor in each of said slots, a bonding and insulating material between said conductors and slot walls for firmly bonding the conductors and slot walls together, said material comprising a product formed in the presence of heat by reacting borax and oxides coated on the surface of said slots, and an identical product between each of said laminations for insulating said laminations from each other but also bonding them together to form a strong unitary core structure.

7. A magnetic core member for a squirrel cage induction motor comprising a plurality of laminations having conductor slots stacked to form a rotor, a cast winding in the slots of said rotor, and a layer of material between said winding and walls of said slots comprising a substance bonded to but electrically separating said slot walls and conductors from each other, said substance further comprising an insulating material.

8. A magnetic core member for a squirrel cage induction motor comprising a plurality of laminations having conductor slots stacked to form a rotor, a cast winding in the slots of said rotor and a layer of glass respectively bonded to the slot walls and to said winding and positioned therebetween for insulating the conductors from the slot walls.

9. The combination according to claim 4 wherein said substance comprises the reaction product of borax and oxides deposited on the walls of said slots which produces the insulating and bonding characteristics when chemically reacted in the presence of heat.

10. An insulated lamination comprising a flat disc of metallic material having a layer of insulation thereon, said insulation comprising a reaction product of an oxide on said disc and borax united chemically by subjecting said disc to a temperature greater than the melting point of borax.

11. A method for bonding metals to each other through the agency of an insulating material comprising the steps of forming an oxide coating on a surface of one of said metals, applying on said oxide coating a substance of a type capable of chemically reacting with the oxide in the presence of heat to provide a reaction product displaying bonding and insulating characteristics, positioning a second metal in abutting relationship with the depositions on the first metal, and subjecting said metals to heat at a temperature sufficient to provide said reaction product so that upon cooling, the material serves to insulate the metals from each other while simultaneously serving as a bond therebetween.

References Cited in the file of this patent

UNITED STATES PATENTS 599,493     Clegg ---------------- Feb. 22, 1898

(Other references on following page)

UNITED STATES PATENTS

| | | |
|---|---|---|
| 1,200,352 | Hadaway | Oct. 3, 1916 |
| 1,266,614 | Newcomb | May 21, 1918 |
| 1,729,848 | Walker | Oct. 1, 1929 |
| 1,735,049 | Lester | Nov. 12, 1929 |
| 1,750,240 | Myer | Mar. 11, 1930 |
| 1,842,970 | Hovey | Jan. 26, 1932 |
| 2,304,067 | Anderson | Dec. 8, 1942 |
| 2,575,724 | McIntosh | Nov. 20, 1951 |
| 2,584,354 | Kissinger et al. | Feb. 5, 1952 |
| 2,761,078 | McAdam | Aug. 28, 1956 |